(12) United States Patent
Kulick, III et al.

(10) Patent No.: US 10,807,804 B2
(45) Date of Patent: Oct. 20, 2020

(54) CONVEYOR CHAIN AND TRANSVERSE MEMBER MONITORING APPARATUS

(71) Applicant: Brentwood Industries, Inc., Reading, PA (US)

(72) Inventors: Frank M. Kulick, III, Leesport, PA (US); Peter Rye, Reading, PA (US); Luke Ellis Habermehl, Easton, PA (US); Jason C. Ruch, Elverson, PA (US); Christopher Stephan Fredericks, Pottstown, PA (US); Alex Ivanovich Mitchell, Wyomissing, PA (US)

(73) Assignee: Brentwood Industries, Inc., Reading, PA (US)

( * ) Notice: Subject to any disclaimer, the term of this patent is extended or adjusted under 35 U.S.C. 154(b) by 0 days.

(21) Appl. No.: 16/348,608

(22) PCT Filed: Mar. 23, 2017

(86) PCT No.: PCT/US2017/023830
§ 371 (c)(1),
(2) Date: May 9, 2019

(87) PCT Pub. No.: WO2018/174889
PCT Pub. Date: Sep. 27, 2018

(65) Prior Publication Data
US 2020/0102152 A1    Apr. 2, 2020

(51) Int. Cl.
*B65G 43/02* (2006.01)
*B01D 21/22* (2006.01)
*B65G 19/10* (2006.01)
*B65G 19/24* (2006.01)
*B65G 43/04* (2006.01)

(52) U.S. Cl.
CPC .............. *B65G 43/02* (2013.01); *B01D 21/22* (2013.01); *B65G 19/10* (2013.01); *B65G 19/24* (2013.01);
(Continued)

(58) Field of Classification Search
CPC ........ B65G 43/04; B65G 19/10; B65G 19/24; B65G 43/02; B65G 19/02; B65G 47/965;
(Continued)

(56) References Cited

U.S. PATENT DOCUMENTS 4,914,964 A    4/1990  Speiser
5,482,154 A    1/1996  Affeldt et al.
(Continued)

FOREIGN PATENT DOCUMENTS

CN    201643804 U    11/2010
DE    20211954 U1    1/2003
(Continued)

OTHER PUBLICATIONS

Int'l Preliminary Report of Patentability dated May 17, 2019 in Int'l Application No. PCT/US2017/023830.

*Primary Examiner* — James R Bidwell
(74) *Attorney, Agent, or Firm* — Panitch Schwarze Belisario & Nadel LLP

(57) ABSTRACT

Apparatus for monitoring alignment of a transverse member conveyor. The member is attached transversely at opposite end portions to two parallel endless chains includes two position sensors affixed and located transversely adjacent to each chain and each other. One or more targets are attached to link(s) of each chain, and at predetermined distances from the member. The position sensors inductively or magnetically sense the relative position of the target(s) on each chain with respect to the respective position sensor adjacent the chain, and send a signal comparing the target and sensor
(Continued)

proximity with respect to the target on each chain. This allows determination of whether the opposite end portions of the member attached to the respective chains are aligned transversely within predetermined tolerance limits. Another aspect is monitoring a single position on an endless chain. Another aspect monitors chain catenary.

26 Claims, 8 Drawing Sheets

(52) U.S. Cl.
CPC ...... *B65G 43/04* (2013.01); *B65G 2203/0233* (2013.01); *B65G 2203/0283* (2013.01); *B65G 2203/043* (2013.01)

(58) Field of Classification Search
CPC ........ B65G 43/00; B65G 23/44; B01D 21/06; B01D 21/22
USPC .................................................. 198/810.03
See application file for complete search history.

(56) References Cited

U.S. PATENT DOCUMENTS

| | | | |
|---|---|---|---|
| 7,370,751 B2 | 5/2008 | Smith et al. | |
| 7,641,039 B2* | 1/2010 | Smith | B65G 39/16 198/370.02 |
| 8,636,140 B2* | 1/2014 | Tout | B65G 23/44 198/814 |
| 9,809,389 B2* | 11/2017 | Pauli | G01L 1/04 |
| 2005/0133341 A1 | 6/2005 | Chiu | |
| 2008/0308391 A1* | 12/2008 | May | B65G 43/02 198/810.02 |
| 2011/0024268 A1 | 2/2011 | Merten et al. | |
| 2011/0050213 A1* | 3/2011 | Furukawa | B65G 43/04 324/228 |
| 2018/0272488 A1* | 9/2018 | Matsuyama | B23Q 17/007 |

FOREIGN PATENT DOCUMENTS

| | | | | |
|---|---|---|---|---|
| DE | 102010043057 A1 | 5/2012 | | |
| EP | 2749510 A1 | 7/2014 | | |
| JP | S5420573 A | 2/1979 | | |
| JP | S5543565 A | 3/1980 | | |
| JP | S5549733 A | 4/1980 | | |
| JP | S55101505 A | 8/1980 | | |
| JP | S55130416 A | 10/1980 | | |
| JP | S5631807 A | 3/1981 | | |
| JP | S6246446 B2 | 10/1987 | | |
| WO | 95/23638 | * | 9/1995 | ............. B01D 21/00 |
| WO | 2012034029 A1 | 3/2012 | | |
| WO | 2013024057 A1 | 2/2013 | | |
| WO | 2013113764 A1 | 8/2013 | | |

* cited by examiner

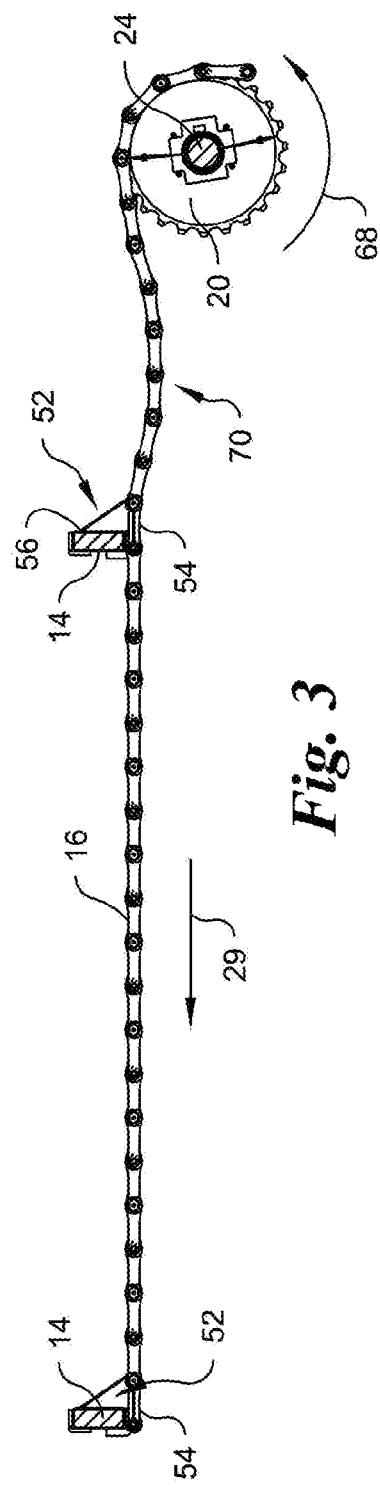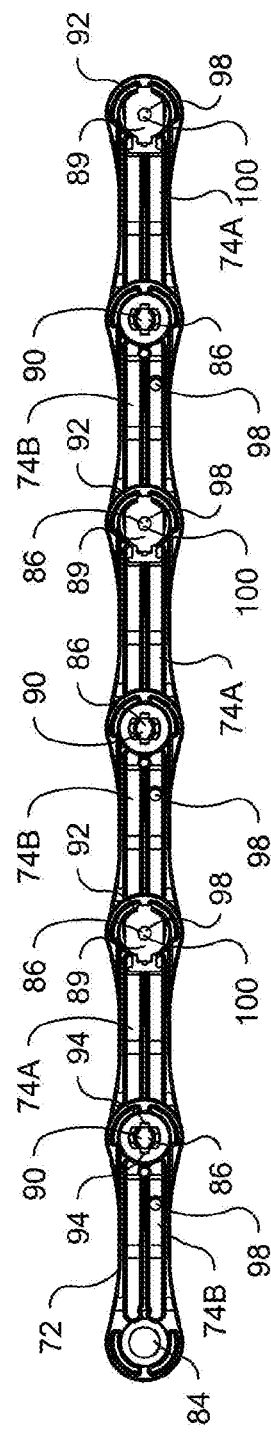

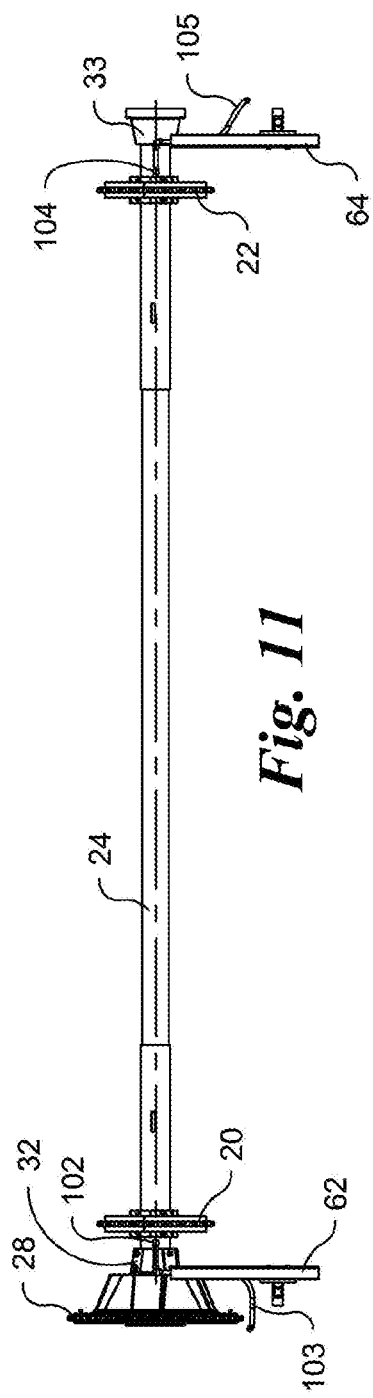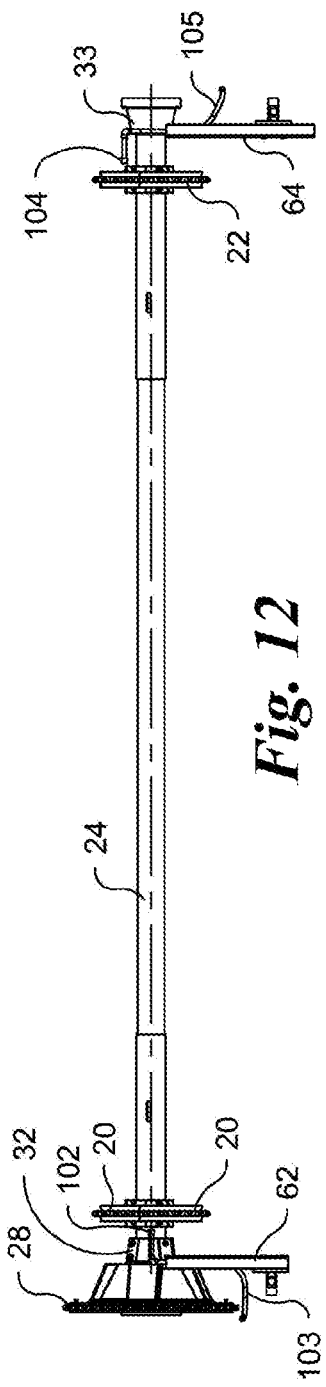

CONVEYOR CHAIN AND TRANSVERSE MEMBER MONITORING APPARATUS

CROSS-REFERENCE TO RELATED APPLICATIONS

This application claims the priority as a Section 371 U.S. national phase application of International Patent Application No. PCT/US17/23830, filed on Mar. 23, 2017 and titled, "Conveyor Chain and Transverse Member Monitoring Apparatus," the entire contents of which is incorporated herein by reference in its entirety.

BACKGROUND OF THE INVENTION

One aspect of the present invention is directed to apparatus, systems and methods for monitoring conveyors driven by endless parallel chains and the alignment of any transverse bars, screens or other transverse members (hereinafter, generally, "members") that extend and are connected by end portions to the chains. In some embodiments, the conveyor can have a continuous belt, mesh, segments or other hinged surfaces (hereinafter "belt") connected to the chains, with the transverse members above the belt. In these embodiments, the transverse members could be integral to the chain; either in its entirety or sectioned, for instance, in halves connected at a position in the middle or elsewhere between the ends of the transverse members between the edges of the conveyor surface. Also in these embodiments, the transverse members urge small and light to very large and heavy objects along the conveyor to various areas for working on the articles or for removing the articles. In other embodiments, there is no conveyor belt, such that the transverse members, typically in the form of bars, called "flights" or screens, themselves convey material by pushing or pulling the material, particularly material such as material floating on a liquid, like light waste on treated liquid, typically wastewater, sometimes called "scum," or settled solids in treated liquid, such as sewage sludge, for example.

More particularly with respect to this aspect, the present invention is directed to monitoring the alignment of the transverse members being carried by the chains to determine whether opposite end portions of the member attached to a respective chain are in transverse alignment within predetermined tolerance limits based on the proximity of at least one target on each chain with respect to sensors fixed adjacent to each chain. The transverse members may become skewed or misaligned by wear of either of the parallel chains, especially if the chains wear unevenly, wear on sprockets driving the chains, slipping, especially uneven slipping, of one or both chains on one or all sprockets, and for other reasons. If the transverse members are not within the predetermined tolerance, they will be skewed and misaligned, which may cause damage to the conveyor or its component chains and transverse members, belts if used, the motor driving the conveyor, and articles or material being conveyed. Therefore, it is important that if and when any misalignment beyond the predetermined tolerance limits is detected, a signal is sent to an operator to stop the conveyor or the apparatus automatically stops the conveyor, so that the misalignment can be fixed, such as by repairing or replacing links in the chain, the entire chain, new sprockets driving the chain, or the like.

Another aspect of the present invention involves monitoring a singular position on a chain to determine chain revolution and related conditions and information using a target mounted directly or indirectly on a chain at the singular position, called a home position. This aspect has important benefits discussed below.

Another aspect of the present invention relates to apparatus, systems and methods for monitoring catenary (the sagging of flexible members) in the chain of a conveyor. Monitoring the catenary by a proximity sensor that inductively or magnetically can sense a target mounted on the chain to determine if the extent of the catenary is beyond predetermined tolerance limits, such that a signal is generated to alert an operator to stop the chain from moving, or the apparatus automatically stops the chain, allowing for needed repairs to the chain, such as removing one or more links, repairing or replacing the sprocket driving the chain, shifting the centerlines of the shafts for the idler sprockets, and other types or replacements or repairs.

Although the present invention has use in a number of industries for a number of purposes, for the sake of understanding, the aspects of the present invention will be described with respect to the use of the conveyor in a sedimentation basin used in water treatment.

In some aspects, the transverse members, called "flights" in this wastewater treatment industry, scrape or move (generically, "collect") light floating scum off of the surface of the wastewater being treated. In other aspects, the flights remove suspended solids, herein called sludge, that settle in the bottom of the treatment basin to an end of the basin (or to a side of the basin, depending on the orientation of the conveyor in the basin, sometimes called cross collectors) toward a lower area of the basin, herein called a sump, for removal of the solids after they build up from time to time. In still other aspects, the conveyor can be sized to remove both scum and settled solids. Some basins include both conveyors, a main conveyor collector arranged so that the flights travel from end to end for a main part of the basin and cross collectors, typically arranged so that the flights travel from one side to the opposite side to remove settled solids deposited by the main conveyor collector into the sump toward an even lower sump area for removal from the sump and the basin.

Sedimentation is a process used in water treatment to separate water from suspended solids to improve the quality of the water and limit the discharge of regulated components into the environment. The sedimentation process is based on the theory of discrete particle settling generally under Stoke's Law, which results in sediment in the form of a sludge blanket on the floor of the basin. This sedimentation or sludge is removed by mechanical means of one or more scrapers or flights in the form of the transverse members, typically bars, which move along the floor to consolidate the sludge for removal from the basin. The flight is connected at each end to a chain loop which cycles via a drive mechanism at low speed to limit turbulence and re-entrainment of solids. The conveyor acts as a collector of the sludge, with the parallel chains to which the flights are connected rotating through a series of sprockets, the flights conveying the sludge via sweeping the floor to the sump most typically at the end of the basin, and upon return conveying the floating scum via sweeping the surface of water. The scum is decanted via scum removal equipment or device to remove the contaminants from the system. Wear strips are located in horizontal conveyance locations in the collection and return sections. A single drive motor typically provides the torque and horsepower required to move the flights along the collection and return paths.

Brentwood Industries, Inc., the applicant of this application and the assignee of the application and invention, offers its SmartGuard® system, a collector monitoring system that includes sprocket motion monitoring (SMM), flight misalignment monitoring (FMM), and an associated control panel. The system protects against failures that can be caused by irregular sludge loading, concrete movement usually in the walls of the basin, and foreign objects. The system identifies collector system overloads that cannot be detected by traditional shear-pin torque monitoring devices. Component placement allows the SmartGuard® system to monitor regular motion, warn of potential danger, and shut down the scum and sludge collector before damage can occur. This early detection approach allows water and wastewater plants to reduce the cost associated with scum and sludge collector failures.

Monitoring sprocket motion allows a warning and/or manual or automatic shutdown of the scum and sludge collector system if loss of motion occurs when identified through sensors placed at the lower-rear idler stub shafts of the sprockets. The sensors used are magnetic proximity sensors where magnets are installed as targets in the rotating lower-rear idler sprockets. Flight alignment information is gathered by two bumper or cam block assemblies that are tripped as flights pass over the head shaft. This flight alignment system is difficult to install, is difficult to set up properly, and can freeze in cold climates due to contact with the wet flights causing damage or loss of flight alignment. A control panel is available with adaptive control that either complements existing control systems or functions as a total control solution.

Brentwood Industries, Inc.'s SmartGuard® system was an innovation over previous technology as it eliminated issues associated with the low tension area installation and targets affixed to the flights. The sensor position of the SmartGuard® system was near the head shaft in the high tension zone. However, the system had operation concerns if a flight was removed during maintenance because the flight acted as the target for the position sensor mechanism. Field setup was difficult due to consistently spacing flights along the length of the chain, while locating cam blocks to mount the flights to the chains the correct distance from the flights required a high level of precision. The use of cam blocks added additional moving parts, increased the complexity of installation and presented issues in submerged and cold weather applications. In certain basin configurations, sufficient structure did not exist to support the sensors, therefore expensive and elaborate structural bracketry was required.

The aspect of the present invention relating to the transverse member or flight position monitoring system uses induction or magnetism regarding the target associated with the chain pin, link, and/or flight attachment link position to determine the alignment of the flight within the basin. In one embodiment, as the chain moves the pin past the sensor, a signal is generated which indicates the position of the target in relation to the sensor. Each chain generates a signal that is compared to the other based on an algorithm (described below with respect to the flow chart of FIG. 13) that takes into account the nominal difference or allowable time between signal pulses. The pulsed signal will have a start and stop (beginning and end) based on the field of influence between the sensor and target. Multiple potential specific algorithms exist to trigger a misalignment and a warning or shutdown event. The start time, stop time, average of start and stop times, or any reasonable combination can be used to trigger the actual position. This aspect uses a target and position sensor that are unaffected by the nature of the wastewater or other liquid with suspended solids present and is less influenced in non-submerged applications in its ability to operate in climates where freezing is prevalent. The water-tight target and sensor can be submerged to eliminate the potential for ice buildup during normal operation.

The desired outcome of the first aspect is the relative position of each end portion of the transverse member or flight and the ability to calculate the actual chain speed. Maintenance actions requiring the removal of the flight or changes to the periodicity of the flight within the endless loop of chain cause a simple mechanical system to be limited in its operation within a treatment plant. Since the target now resides on or in the chain, the scum and sludge collector can remain in operation during maintenance procedures involving flight removal. The desired flight speed is related to the speed as the flight scrapes the basin floor, so that the system that directly measures the speed of the flight in the high tension zone in contact with the floor is desirable. Since the flight monitoring device is intended to determine misalignment of the flight (e.g., the chain slips on the sprocket), as well as the actual speed of the flight during its scraping action, this aspect of the invention is a significant improvement over previously known systems.

The flight monitoring aspect of the invention generates an approximate cost reduction of 50 to 75% over the SmartGuard® system. The straightforward design of the apparatus of this aspect of the present invention reduces cost by eliminating the complex and heavy bumper or cam block assemblies and various support configurations based on basin design integration. This will reduce both equipment and installation costs.

The aspect of the present invention relating to monitoring a singular position corresponding to the home target, on an endless chain conveyor has several advantages. Some non-limiting benefits include: avoidance of damage and wear, which is the reason for preventative maintenance; keeping track of the number of articulations or revolutions, aid in catenary monitoring, which can provide an indication of a maintenance interval or intervals for preventative maintenance; identification of flight numbers; enhancement of troubleshooting; other provisions for predictive maintenance; and controllability for intermittent operation or stopping the conveyor movement to allow use of a probe to measure settling of suspended solids, such as sludge; and to provide information about torque monitoring systems.

The other aspect of the present invention relating to apparatus for monitoring the catenary in the conveyor chain is important in determining wear of the chain, the sprockets driving the chains or serving as idler sprockets, or both chain wear and sprocket wear. Often the extended catenary is an indication of wear and a signal from a catenary sensor or sensors can allow for an operator to stop the conveyor or automatically stopping the conveyor to assess and repair any damage. Catenary monitoring allows for preventative maintenance to reduce the probability of chain slip or tooth hop from too much slack. By removing a link or more to re-tension the chain, the likelihood of tooth hop on the sprocket is eliminated. Tooth hop is the leading cause of flight misalignment, as both chains do not necessarily hop concurrently due to varying operational load and wear. The catenary is accumulated in a low tension zone of the chain immediately after the head shaft and immediately prior to the tail shaft idler sprocket, which is located before the beginning of the tension zone, typically at the set of sprockets in the settling zone and opposite the withdrawal point or cross collector, at the start of the floor sweep. Measurement of catenary position can be achieved in either low tension location, as the catenary in both locations is an indication of wear.

BRIEF SUMMARY OF THE INVENTION

The first aspect of the present invention relates to an apparatus for monitoring alignment of a transverse member in an endless chain conveyor comprised of interconnected chain links, where the member is attached transversely at opposite end portions to and between two parallel chains, the apparatus comprising:

two position sensors, one position sensor being located transversely adjacent to each chain at a first fixed position sensor location with respect to the other position sensor at a second fixed position sensor location;

at least two targets, at least one target attached to each chain at a fixed target location, the targets being associated with the member by predetermined distances;

the position sensors being capable of inductively or magnetically sensing the relative proximity of the targets associated with the same member on each chain and being capable of sending a signal when sensing the targets; and based on the respective signals sent regarding the proximity of the position sensors to the respective targets associated with the same member, the apparatus being capable of determining whether the opposite end portions of the member attached to a respective chain are in transverse alignment within predetermined tolerance limits based on timing of the respective signals.

A second aspect of the present invention is apparatus for monitoring a singular position corresponding to one target position with respect to an endless chain, designated as a home target position, the apparatus further comprising a position sensor located adjacent to the chain at a fixed position sensor location with respect to the home target position;

a target directly or indirectly attached to the chain at a fixed home target position;

the position sensor being capable of sensing the home target and being capable of sending a signal when sensing proximity of the home target; and based on the signal sent regarding the proximity of the position sensor to the home target, the apparatus being capable of determining each singular position with respect to the endless chain.

A third aspect of the present invention relates to an apparatus for monitoring catenary in an endless chain conveyor comprising interconnected chain links, the apparatus comprising:

a catenary sensor adjacent to the chain and at a location corresponding to the lowest acceptable catenary of the chain;

at least one target being mounted on one or more links in one or more positions of the chain, the target being capable of being magnetically sensed by the catenary sensor when the target is adjacent the catenary sensor;

the catenary sensor activating a signal when a target on the chain is adjacent the sensor to indicate an unacceptable catenary in the chain.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings, where like numerals identify like elements throughout the several views, embodiments which are presently preferred. It should be understood, however, that the invention is not limited to the precise arrangements and instrumentalities shown.

In the drawings:

FIG. 3 is a side elevation view of a portion of a chain and two flights on the top run taken along the lines 3-3 of FIG. 2;

FIG. 4 is an enlarged side elevation view of a several chain links in a chain looking from the direction of a side wall toward the interior of the basin, along the lines 4-4 in FIG. 2, with three targets to be sensed attached to three of the chain links;

FIG. 11 is a top plan view of the head shaft and head shaft sprockets of the conveyor, with the chains removed for ease of illustration, showing sensors attached to supports outboard of the chain location, and showing one embodiment of the sensors generally in a transverse alignment with respect to each other on the outboard sides of the head shaft sprockets;

FIG. 12 is a top plan view of the head shaft and head shaft sprockets of the conveyor, with the chains removed for ease of illustration, similar to FIG. 11, but showing another embodiment of the sensors in a transverse offset arrangement with respect to each other on the outboard sides of the head shaft sprockets.

DEFINITIONS

Figure 1:
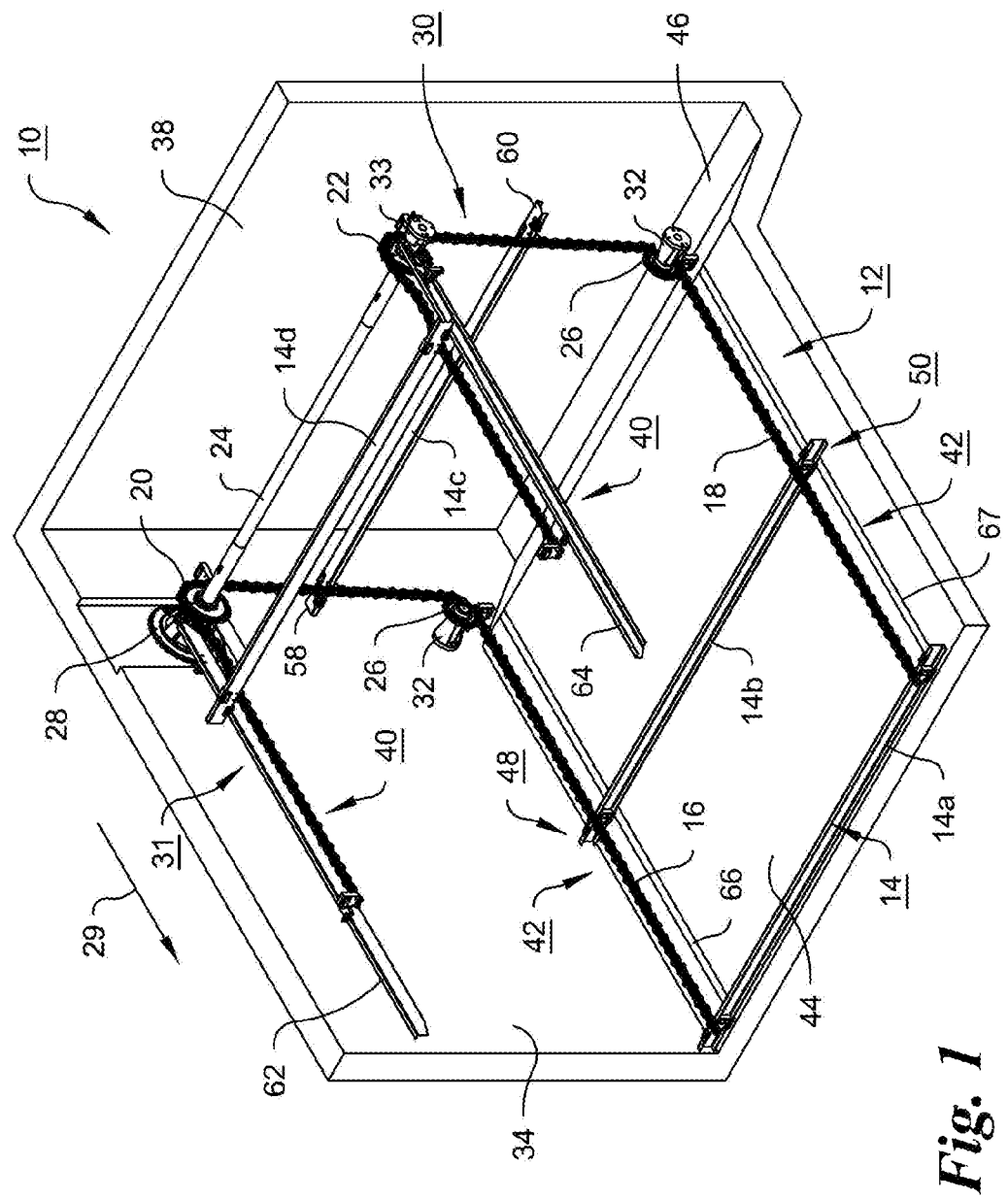
FIG. 1 is an isometric partial view of one embodiment of a water treatment sediment settlement basin with one sidewall removed showing a conveyor with few flights or transverse members attached to parallel chains, wherein only portions of the length of the endless chains are shown, primarily to show one embodiment of the present invention in one environment of its use.

In addition to any definitions set forth elsewhere herein, the following definitions relate to the invention described and claimed in this application.

As used herein, the singular forms "a", "an", and "the" include plural referents, and plural forms include the singular referent unless the context clearly dictates otherwise.

Certain terminology is used in the following description for convenience only and is not limiting. Words designating direction such as "bottom," "top," "front," "back," "left," "right" "upper," "lower," "sides" and "ends" designate directions in the drawings to which reference is made, but are not limiting with respect to the orientation in which the conveyor can be mounted in a settlement basin. The terminology includes the words specifically mentioned above, derivatives thereof and words of similar import.

As used herein, the term "transverse" means in a direction substantially perpendicular to the longitudinal axis or length of the parallel chains of the conveyor.

As used herein, the term "substantially" with respect to any description of any element or parameter, including without limitation the transverse relationship of the transverse members or flights with respect to the chains, means sufficiently close to the precise parameter or relationship to be within reasonable industrial manufacturing tolerances and use conditions that would not adversely affect the function of the element or parameter or apparatus containing it. By way of example, if the transverse members or flights are not exactly perpendicular to the longitudinal axis or length of both parallel chains, but are within a predetermined amount of tolerance so as not to be considered so misaligned or skewed that the operation of the apparatus is affected, then they are substantially transverse and equivalent to transverse with respect to the parallel chains.

DETAILED DESCRIPTION OF THE INVENTION

FIG. 1 is an isometric partial view of one embodiment of a water treatment sediment settlement basin 10 showing a conveyor 12, sometimes called a collector in view of the collection of floating scum and sinking solids in this environment, with a merely exemplary number of flights or transverse members 14, variously identified by numerals 14a, 14b, 14c and 14d in FIG. 1. The flights can be in the form of extruded C-channel shaped members, rectangular members or can have other cross-sections with further reinforcement or stiffness ribs and flanges, or other appropriate shapes, and can be made of fiberglass or other appropriate strong and durable material. The flights 14, are attached as explained below transversely to parallel endless chains 16 and 18, and are spaced from one another, preferably, but not necessarily evenly along the length of the chains. Only portions of the length of the endless chains are shown in FIG. 1, primarily to show one embodiment of the present invention in one environment of its use. The chains can be made of any material, such as metal or in the environment of water, preferably glass fiber reinforced plastic, such as glass reinforced polyester, although other durable materials can be used if desired, and can include stainless steel barrel wraps where the barrels of the links forming the chains contact sprockets that drive and support the chains.

The chains extend around a series of sprockets, such as a pair of head shaft sprockets 20 and 22, mounted on opposite end portions of a head shaft 24, and a number of idler sprockets 26, only two of which are shown in FIG. 1, support the endless chains in their desired locations within the basin 10 defining where the chains and flights travel. A driven sprocket 28, is driven by a motor (not shown) connected to the driven sprocket in a well-known manner by a chain or gearing (not shown). The driven sprocket 28 is also connected to the head shaft 24, causing the chains 16 and 18 to travel in a direction shown by an arrow 30 by the means of sprockets 20 and 21 on head shaft 24. The sprockets likewise can be made of any durable material, and in a preferred embodiment for use in the illustrated environment are made of high strength nylon, for example. The head shaft sprockets 20 and 22 are supported by spindles 33, and the idler sprockets 26 are supported by stub shafts 32 (two shown in FIG. 1), all of which can have ultra-high molecular weight polyethylene bearings for long life. Other configurations are available for supporting the chains, drive shafts and idler stub shafts, but the described head shaft and head shaft sprockets, spindles and stub shafts are presently preferred. The stub shafts 32 and spindles 33 are attached to the side walls 34 and 36 of the basin, the length of the side walls defining the length of the basin 10, for collectors mounted longitudinally in a basin 10, as shown, but they may be mounted to the end walls (only one end wall 38 is shown in FIG. 1) where the collectors can be mounted as cross collectors. The location of other idler sprockets and stub shafts, not shown, determine the path of the endless chain conveyor 12 in the basin 10. Typically, and without limitation, there are two more pairs of idler sprockets and stub shafts mounted on and near the top and bottom of the side walls 34 and 36 near the end wall opposite the end wall 38. The description of the motion of the conveyor 12 will be based on this typical setup of the other pairs of idler sprockets and stub shafts. The width of the basin 10 is defined by the length of the end walls.

With reference to FIG. 1, there are two general zones associated with the endless chains 16 and 18 for the conveyor. A high tension zone of the chains is located "upstream" of the driving head shaft sprockets 20 and 22 and is designated generally as high tension zone 30. The high tension zone extends in the downward section from the head shaft sprockets 20 and 22 to the first pair of idler sprockets 26 shown in FIG. 1, and extends in the chains 16 and 18 travelling along the floor 44 of the basin to the lower set (not shown) of idler sprockets opposite the idler sprockets 26. This is the high tension zone because the chain is driven in this zone to pull the flights 14 (represented by flights 14a and 14b) along the floor of basin to collect the sediment solids settled from the wastewater, and extends upward just to the head shaft sprockets 20 and 22. The low tension zone of the chains is located "downstream" from the driving head shaft sprockets, since the chains are not in high tension, and is designated generally as low tension zone 31. The low tension zone begins directly downstream after the head shaft sprockets 20 and 22 where there is usually a sag or catenary 70 (visible but not labeled in FIG. 1 and shown more clearly as 70 in FIGS. 3 and 5), and extends to the upper idler sprockets (if used and not shown) opposite the head shaft sprockets 20 and 22 and down to the lower idler sprockets (not shown) (the tail shaft idler sprockets) opposite the idler sprockets 26.

The chains and flights in the low tension zone include an upper return section 40 placed so that the flights 14 (such as flight 14*d*) can move the scum floating on the surface of the wastewater being treated toward the scum removal equipment or device. The expected wastewater level is shown schematically by level 41 in FIG. 5. The chains 16 and 18 and flights 14 (such as flights 14*a* and 14*b*) include a lower section 42 adjacent the floor 44 of the basin for scraping sludge solids from the floor and moving them toward an end sump 46 where the solids are collected and eventually removed. In some systems, cross collectors are often used to concentrate the sludge collected by the longitudinal collector or conveyor that is deposited into the end sump 46 into a corner sump. Cross collectors scrape perpendicular to the longitudinal conveyors.

Figure 2:
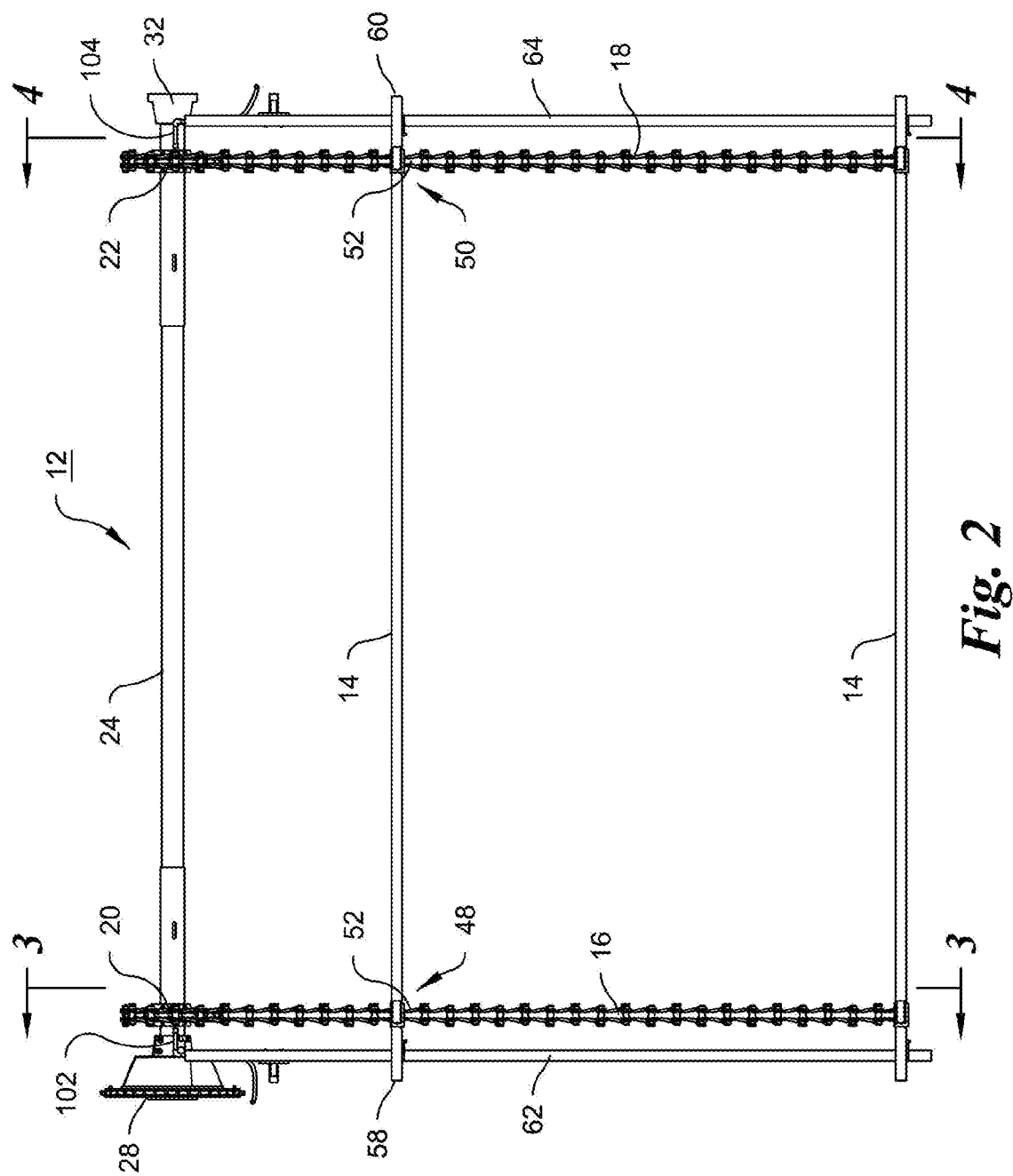
FIG. 2 is a top plan view of a part of the top section of the embodiment of the conveyor of FIG. 1 without the basin walls, showing only a portion of the top run of a portion of the endless chain, and also showing one embodiment of the placement of sensors fixed to the portions of an upper run support.

In the environment and orientation of FIG. 1, and also referring to the top plan view of the conveyor 12 in FIG. 2 and to a side elevation view of a portion of the chain 16 in FIG. 3, the flights 14 at their opposite end portions 48 and 50 are attached to chains 16 and 18 by attachment links. The attachment link 52 has a link portion 54 that forms part of the chain and an attachment portion 56 to which the flights are bolted. The link portion 54 and the attachment portion 56 are integrally and unitarily molded or otherwise formed and made of the same material as the other chain links. Initially, the attachment links are transversely located on each chain. The flights are spaced from each other, preferably evenly along the length of the chains. The number and spacing of the flights from each other depend on their intended use. The opposite ends 58 and 60 of the flights 14, corresponding to the respective end portions 48 and 50 of the flights, extend outwardly past the chains and optionally but preferably are supported by upper return rails 62 and 64, and optionally but preferably by lower collector rails 66 and 67 shown in FIG. 1. Typically, the return rails are supported by brackets on the walls of the basin, such as the side walls 34 and 36 as shown in FIG. 1. The return rails 66 and collector rails 67, which can be made of fiber reinforced plastic, or other strong and durable material, support the weight of the flights and much of the weight of the chains that the sprockets do not support and define the location where the flights travel when moved by the chains 16 and 8. The collector rails 67 act as floor wear strips. The surface of the return and collector rails that support the ends of the flights optionally but preferably can have on their upper support surfaces low friction wear strips and the areas of the flight ends contacting the low friction wear strips optionally but preferably can have wear pads that bear and slide against the wear strips of the return and collector carry rails.

The chains and flights move in the direction of the arrows 29 in FIGS. 1 and 3, when the motor drives the driven sprocket 28, so the head shaft sprockets 20 and 22 (only the head shaft sprocket 20 is shown in FIG. 3), rotates counterclockwise as shown by the arrow 68 in FIG. 3. As a result, the portion of the chains between the head shaft sprockets 20 and 22 in the upper run 40 and the idler sprockets in the lower collector section 42, such as the idler sprockets (not shown) attached to a lower portion of the side walls 34 and 36 adjacent the lower portion of the end wall opposite the end wall 38, are in the high tension zone 30. The portion of the chains that just left the head shaft sprocket 20 are in the low tension zone 31 discussed above and have a sagging portion or catenary 70, best seen in FIGS. 3 and 5.

Figure 10A:
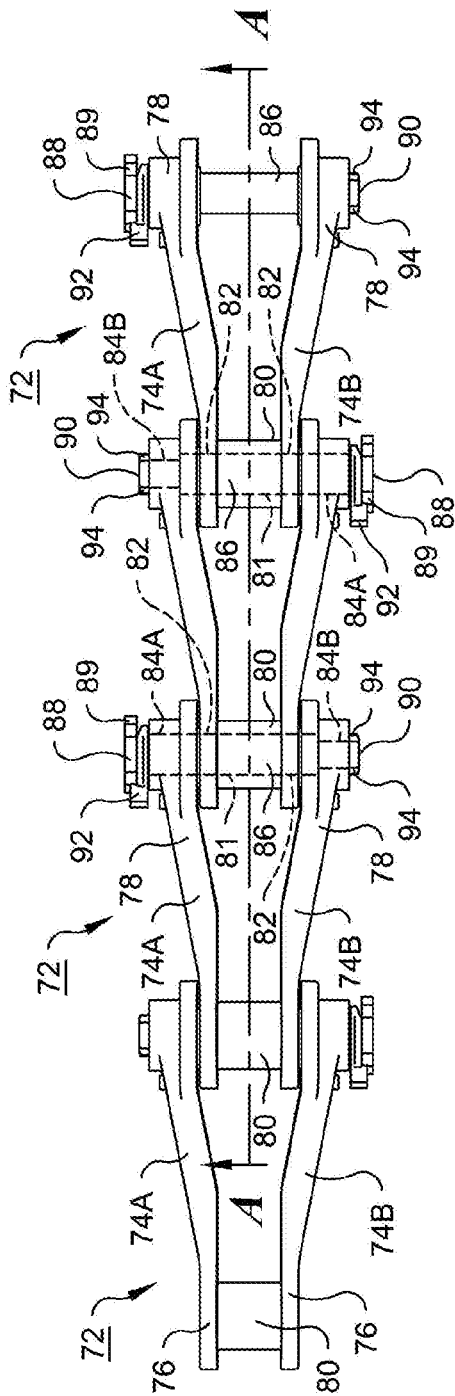
FIG. 10A is a top plan view of a few links of a new chain.
Figure 10B:
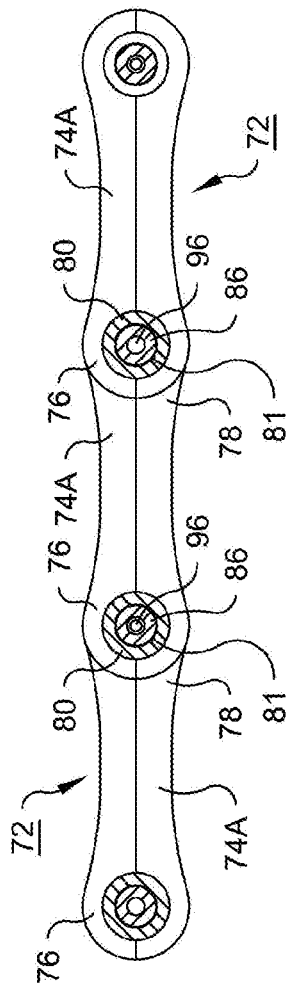
FIG. 10B is a cross-sectional view of some links of the new chain of FIG. 10 taken along line A-A of FIG. 10A.

Before describing the details of the targets attached to the chains and the position sensors which inductively or magnetically sense the targets, forming one aspect of the invention, it will be helpful to discuss the structure of the chain links 72, which make up the endless chains 16 and 18. There are many types of chains and chain links forming them that could be used instead of the presently preferred embodiment of the chains and chain links forming them, such as chain links made of two barrels and two yokes or straight side members with pins that can be made of various materials such as engineered plastics, steel, aluminum, etc. However, the following description is of the presently preferred embodiment, which is only one non-limiting exemplary embodiment. Referring most clearly to FIG. 10A and the pins that hold the links together best seen in FIGS. 6 and 7, there are four chain links 72 shown in FIG. 10A and three chain links shown in FIG. 10B. Each chain link comprises side members 74A and 74B with a first, relatively narrow end 76 (the left ends of the links of FIG. 10A) and a second, relatively wide end 78 (the right ends of the links of FIG. 10A), compared to the relatively narrow first end 76. A transverse barrel 80 in the form of a hollow cylinder with an aperture 81 passing axially therethrough extends between and is unitarily and integrally molded with the first, narrow ends 76 of both of the side members 74A and 74B to connect the side members. The first, narrow ends 76 of the side members 74A and 74B have apertures 82 aligned with the aperture 81 of the barrel 80.

The second, wide ends 78 of the side members 74A and 74B of one link 72 are transversely next to (on the outside sides of the first, narrow ends 76 of the side members 74A and 74B of the longitudinally adjacent link 72), and have apertures 84A and 84B, respectively, that are aligned with the apertures 82 of the first, narrow ends 76 of the side members 74A and 74B of a longitudinally adjacent link 72 and with the aperture 81 of the barrel 80 extending between the side members 74A and 748 at their first, narrow ends 76. The second, wide ends 78 of the side members 74A have large diameter apertures 84A and the second, wide ends of the side members 74B have smaller diameter apertures 84B for purposes described below.

A pin 86 (FIGS. 6 and 7, as well as FIGS. 4, 10A and 10B) passes through the aperture 84A in the second, wide end 78 of the side member 74A of one link 72, through the aperture 82 of the adjacent first, narrow end 76 of the side member 74A of the next longitudinally adjacent link 72, through the axial aperture 81 in the barrel 80, through the aperture 82 of the first, narrow end 76 of the side member 74B, and through the aperture 84B in the second, wide end 78 of the side member 74B of the next longitudinally adjacent link 72, all as best shown in FIG. 10A with reference to the middle two links 72. As a result, the pin 86 rotatably connects the first, narrow ends 76 of the side members 74A and 74B of one link with the second, wide ends 78 of the side members 74A and 74B of the next adjacent link 72, thereby connecting together adjacent links 72.

Figure 6:
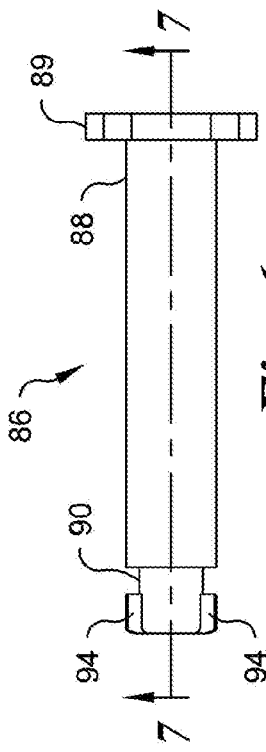
FIG. 6 is a side elevation view of a pin used to connect the chain links together in the chains.
Figure 7:
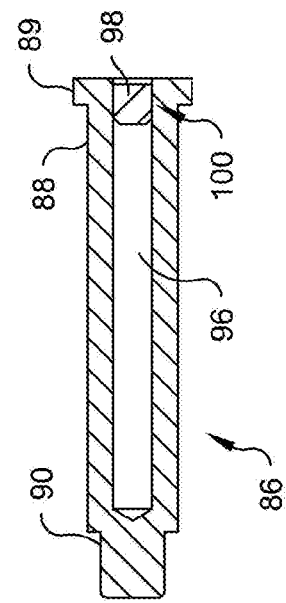
FIG. 7 is a cross-sectional view of the pin of FIG. 6 along the lines 7-7 of FIG. 6, showing a target within a hollow portion or bore of the pin.

With reference to FIGS. 6 and 7 most clearly, where the following elements of the pin 86 are described, the pin 86 has a first, head end 88, with a large diameter or other large cross-sectional dimension at its head 89 to prevent the pin from going all the way through the apertures 82 and 84A, and a second, opposite end 90 with a reduced diameter. Lateral flanges 94 at the second end 90 of the pin fit within mating openings of the apertures 84B as described below. The apertures 84B of the second, wide ends 78 of the side members 74B of the links 72 have a small diameter to accommodate the reduced diameter of the second end 90 of the pin 86. With reference to FIG. 10A, showing four pins 86 counting from the left side of the drawing, the apertures 84B in the wide, second ends 78 of the side members 74B of the second and third connected links 72 from the left of FIG. 10A have openings with a stepped circular circumference having two wider lateral openings to accommodate and mate with the two flanges 94 at the second end 90 of the pins 86. The lateral openings in the apertures 84B are aligned with the lateral flanges 94 so that the lateral flanges can be inserted into the lateral openings. The pins 86 are then rotated 90° with respect to the lateral opening to a retaining position and when the clips 92 are installed at the head ends 88 of the pins 86, by which the pins are retained in place to rotatably connect the longitudinally adjacent links 72 firmly together.

The links 72 have specific side members 74A and 74B, such that the respective apertures 84A and 84B in the second, wide ends 78 of the side members 74A and 74B have the different dimensions and shapes for the different purposes described above. As a result, the same second and third links 72 are rotated 180° (in and out of the plane of the paper of the drawing) with respect to each other to prevent camber and caster issues due to manufacturing variances, such that the manufacturing variances balance out when every other link 72 is rotated 180°. This means that the pins 86 are inserted into the apertures from opposite directions in every other chain link connection. With further reference to FIG. 10A, this relationship can be seen in the second through fourth links from the left, where the head end 88 of the pin 86 is inserted into the apertures in the links and barrel from the top as shown in the drawing to rotatably connect the second and third links. The head end 88 of the pin 86 is inserted into the apertures in the links and barrel from the bottom as shown in the drawing to rotatably connect the third and fourth links. Thus, due to the unique openings of the apertures 84A and 84B on opposite side members 74A and 74B of the links, the pins 86 that connect the links can only be inserted into the apertures in one direction.

A generally C-shaped clip 92 best seen in FIGS. 4 and 10A, closely fits the diameter of the first or head end 88 adjacent the head 89 of the pin and is retained in place by friction and by the head 89 of the pin. The pin has a substantially axial hollow portion or bore 96 extending from the first or head end 88 toward the second end 90 opposite the head end 88, but short of where the diameter of the second end narrows. The bore 96 need not extend so far toward the second end 90 as shown in FIG. 7.

Since the pins 86 are inserted from opposite directions into the apertures 84B, 82, 81, 82 and 84A for every other link connection, when the targets 98 are inserted into the bores 96 of the pins 86 to have the presently preferred target placement 100 (FIG. 7), the targets 98 can only be inserted in every other chain link, if desired, so that they are to be facing a position sensor fixed adjacent to the endless chains 16 and 18. As a result, the orientation of the links 72 of the chain 16 are offset from the orientation of the links 72 of the other chain 18 by the length of the chain links, such as by about 6 inches (about 15.24 cm) for chain links of that length. The position sensors preferably are mounted and the control system of the processor is programmed to take into account the offset in transverse alignment of the targets to the position sensors.

As shown best in FIG. 4, at least one target 98 is attached to at least one link per chain (for example the middle target 98 just attached to the side member 74B of the third link 72 from the left) by being adhesively attached or attached by fasteners, such as screws, to a side member of at least one chain link 72 on the side of the link to be aligned so as to be sufficiently adjacent, and preferably transverse to a position sensor, described below, so that the target 98 can be sensed, preferably inductively or magnetically by the position sensor, especially when only one target is attached to the chain as explained below. By attaching one target to one link only, rather than to more than one or substantially all links, including only for purposes of illustration, where targets 98 are attached to the side members and to pins 86 at preferred locations 100 in the pin bores 96, as schematically shown in FIG. 4.

As shown in FIG. 4, there are three targets 98 attached to side members 74 of three chain links, where the center link may be designated the home link and the other links intermediate links. The targets 98 can be attached to only one position (the home position) in one or both chains as described below or at the home position, which can be one link (the home link) and one or more intermediate links located anywhere else in the chain. The targets 98 could be attached to each chain link, if desired, but it is not necessary to do so to achieve the results of the various aspects of this invention. The targets are made of metal or magnetic material (which can include metallic or magnetic particles embedded in or mixed with plastic resin), or an electrically conductive polymer, so as to be able to be sensed inductively or magnetically, respectively, by the position sensors 102 and 104 (FIGS. 2, 8 and 9), to sense the transverse alignment of the transverse members 14, the home position by a sensor or the catenary of one or both chains by a catenary sensor 106 (FIG. 5), discussed in more detail below. By attaching targets 98 to the attachment links 52 for the flights 14, or to links 72 adjacent to the attachment links 52 for the flights, the proximity of the opposite ends of the flights with respect to each other and to the position sensors aid in monitoring the transverse alignment of the flights on the chains. Instead of separate targets 98, existing components of the conveyor chains 16 and 18 can be made of metallic or magnetic materials to serve as the targets, such as pins, clips, chain link side members or portions thereof, for example. These components are described below.

The preferred locations 100 of the targets 98 are in the hollow portions or bores 96 of the pins 86 connecting the links 72, as most clearly seen in FIG. 7. The location of the targets in the bores of the pins is also shown at three exemplary locations 100 in FIG. 4. By placing the targets 98 in the locations 100 in the bores 96 of the pins, the targets can be retained more positively and readily by friction or encapsulated within the bores 96, such as by epoxy or other waterproof sealant which would protect the targets, for example, from the scum or settled solids or other components of the wastewater being treated. Presently, it is preferred to use adhesive to attach the targets to the chain, either directly on the chain or also as preferred, within the bore 96 of the pin 86. However, mechanical fasteners, such as screws, can be used to attach the targets to the side members 74A or 74B of the links 72.

The targets in the hollow portions or bores 96 of the pins 86 or elsewhere on the chains can be spaced a common predetermined distance between the transverse members or flights 14 on or along each chain 16 and 18. The common predetermined distance of the targets located between the flights 14 can be evenly spaced, but need not be evenly spaced. The even spacing provides consistency in location of the target and in assembly, as well as the orientation and target signal generation and processing for monitoring the transverse alignment of the transverse members or flights 14.

Preferably, but not necessarily, the targets 98 are placed within a pin bore 96 at a location 100 in the pin 86 at least one link 72 of one chain 16, say in an inboard position, and are aligned relatively transversely but offset by the alternate placement of pins in the link apertures with a target 98 placed with the bore 96 of the pin 86 of at least one link 72 in the other chain 18, say in an outboard position. The opposite inboard and outboard positions are largely based on manufacturing considerations, such that the attachment link 52 that attaches the flights or other transverse members to the chains can be manufactured so that it is only necessary to make in the attachment links 52 one shape of apertures, rather than different shape apertures corresponding to the apertures 84 in the side members 74 of the other chain links 74. This avoids having to have different tooling and molding for two types of attachment links 52. In any event, so that the position sensors can sense the targets 98 in the bores 96 of the pins 86 in locations 100, the targets of each chain face the respective position sensor fixed adjacent the respective chain.

As mentioned, the targets 98 are inductively or magnetically sensed by position sensors 102 and 104, which can have position sensor bodies and the actual position sensor portions, hereinafter just identified as position sensors 102 and 104. The position sensors are fixedly attached to a support, such as brackets (not shown), which in turn are attached to the side walls 34, 36 or the end walls, such as the end wall 38. The position sensors must be adjacent to the chains so as to be able to inductively or magnetically sense the targets 98 attached to the side members 74 or within the bores 96 of the pins 86 at locations 100 of the chain links 72. The placement and locations of the position sensors 102, 104 need not be but preferably are adjacent the head shaft sprockets 20 and 22 or in the high tension zone 30 and below the water level 41 (FIG. 5), as shown for example in FIGS. 2, 8, 9, 11 and 12, showing various placements and locations of the position sensors 102, 104. Because the position sensors inductively or magnetically sense the targets 98, the position sensors are effective below the water level 41 and are not affected by murky water or wastewater or freezing conditions above the water or wastewater level, like prior sensors, even inductive sensors, which may have been covered or coated with ice or snow.

Regarding the placement and location of the position sensors, FIGS. 2 and 11, top plan views, show the position sensors 102 and 104, respectively in the high tension zone 30 on the outboard side of the drive sprockets 20 and 22, and show that the position sensors are relatively transversely aligned with each other. FIG. 12, also a top plan view, shows the position sensors 102 and 104 and are, respectively on the outboard side of the drive sprockets 20 and 22 in the high tension zone, but shows that the position sensors are not transversely aligned with each other, but instead the position sensors 102 and 104 are offset from each other. A combination of inboard or outboard position sensor placements being transversely aligned or preferably offset and not transversely aligned may be used depending on the system design to achieve the same result.

Figure 9:
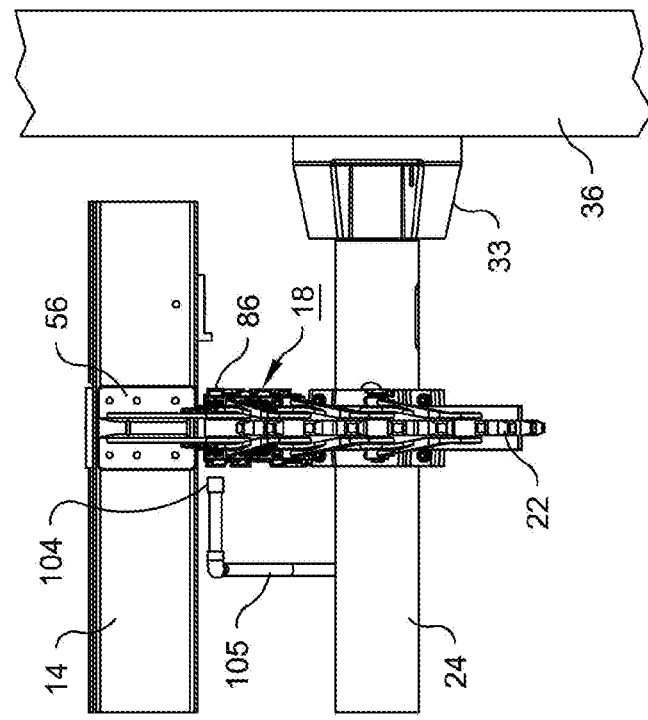
FIG. 9 is a side elevation view of a portion looking toward the end wall of the basin shown in FIG. 1, showing a portion of a flight attached to a portion of a chain passing over a head shaft sprocket with another embodiment of a sensor attachment inboard of the chain and not directly adjacent the wall of the basin.
Figure 8:
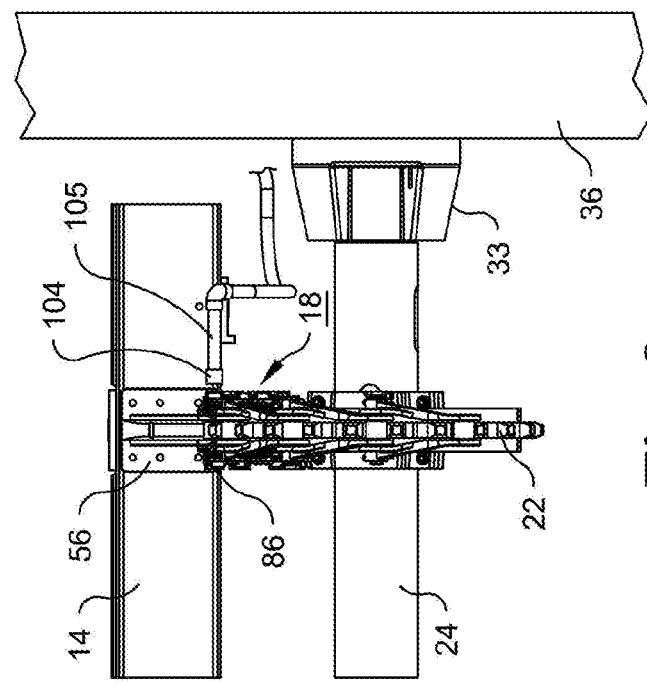
FIG. 8 is a side elevation view looking toward the end wall of the basin shown in FIG. 1, showing a portion of a flight attached to a portion of a chain passing over a head shaft sprocket with one embodiment of a sensor attachment outboard of the chain adjacent the wall of the basin.

FIG. 8, a side elevation view looking toward the end wall 38 of the basin 10, shows a position sensor 104 adjacent to and facing a pin 86 containing a target 98 and located outboard of the head shaft sprocket 22, between the head shaft sprocket 22 and the side wall 36. Thus, in this embodiment, the position sensors have their position sensor portions outboard of and adjacent to the chains between a respective chain and an adjacent side wall or end wall of the basin 10. FIG. 9, a side elevation view looking toward the end wall 38 position the basin 10, similar to FIG. 8, shows a position sensor 104 adjacent to and facing a pin 86/target 98 and located inboard of the head shaft sprocket 22, between the head shaft sprocket 22 and the interior of the basin 10. Thus, in this embodiment, the position sensors have their sensor portions inboard of and adjacent to each chain between a respective chain and a longitudinal midline or transverse midline of the basin 10.

When the position sensors sense the position of the target or targets 98 on each chain 16 and 18, the position sensors send signals to monitor the position of the target or targets on each chain 16 and 18 with respect to the target or targets on the other respective chain 18 and 16 to assure that the target or targets, and therefore the end portions 48, 50 and extended ends of the flights 14 or other transverse members are in transverse alignment within predetermined tolerance limits for the particular use of the conveyor and the flights or other transverse members carried by the chains based on the proximity of the target or targets on each chain with respect to the position sensor fixed adjacent to the chain. Since the target or targets are a known distance from the transverse members or flights 14 attached to the chains at their end portions 48, 50, the alignment of the end portions 48 on one chain can be determined with respect to end portions 50 on the other chain, the alignment of the flights with respect to the chains and to any adjacent spaced flight can be determined and monitored. The alignment regarding the proximity of the position sensors to the respective targets associated with the same transverse member or flight 14 at its opposite end portions 48, 50 on the different chains is determined as to whether the opposite end portions of the member attached to a respective chain are in transverse alignment within predetermined tolerance limits based on timing of the respective signals from the respective position sensors. The position sensors send a signal every time the position sensors are in close proximity of the targets adjacent the position sensors. The programming of the processor receiving the signals determine if the timing of the signals from the position sensors adjacent each chain exceed the predetermined timing tolerance limits, indicating that the targets 98 associated with the respective end portions 48, 50 of the transverse members or flights 14 are misaligned. The processor then sends a misalignment signal that can be visual or auditory or both to alert an operator to stop the conveyor 12 and to inspect, adjust, repair or replace the chain or any components of the conveyor system. Alternatively and preferably, the processor receives the signals from the position sensors regarding the relative proximity of the location of the target or targets with respect to the position sensors 102, 104 fixed adjacent to the respective chains to automatically stop the conveyor 12, so that the chains, sprockets and other components of the apparatus can be adjusted, repaired or replaced.

Association of one target 98 directly or indirectly with an endless chain in any environment where the chain is involved in any use impacts the second aspect of the present invention: Apparatus for monitoring a singular position corresponding to one target position with respect to an endless chain, designated as a home target position, the apparatus further comprising a position sensor located adjacent to the chain at a fixed position sensor location with respect to the home target position; a target directly or indirectly attached to the chain at a fixed home target position; the position sensor being capable of sensing the home target and being capable of sending a signal when sensing proximity of the home target; and based on the signal sent regarding the proximity of the position sensor to the home target, determining each singular position with respect to the endless chain.

Where only one target 98 is attacked directly or indirectly to one chain 16, or 18, such as on a side member of a link, in a bore of the pin, attached to an attachment link 52 or even to an end of a transverse member 14, the location of the target may be designated as a home target position or just the home position. Where the home target position is on a single chain link in a chain, that single link can be designated as the home link. Where parallel endless chains are used for any purpose, a home target defining a home position can be associated with each chain. In these embodiments involving a home position, the position sensor can sense the target and thereby keep track of the number of rotations of the chain to monitor the expected life of the chain and to anticipate when repair or replacement of the chain 16 or 18, one or more links 72 of the chain, or other components, such as sprockets, is needed. Also, where two endless chains carry opposite ends 58, 60 of the respective end portions 48, 50 of transverse members, such as flights 14, for example in a wastewater treatment tank, the relatively transverse locations of each home position on each chain, located with respect to the transverse members, can monitor the transverse alignment of each end 58, 60 of the end portions 48, 50 of the flights 14 or other transverse members on the respective chains 16 and 18.

This inventive concept of monitoring a home position associated with an endless chain can involve various types of position sensors that operate based on the proximity of a target of any type and any type of position sensor. The targets can have a mechanical element such as a cam or extension that can trip a mechanical switch or flexible feelers that can be associated with a switch, for instance. Lasers or other optical sensors can sense targets that can be in the form of bar codes on labels, as another non-limiting example. In environments where freezing of liquids like water may be an issue for mechanical systems, or murkiness of the environment may make optical sensing unreliable, the targets and position sensors can operate on the basis of induction or magnetism.

Some non-limiting benefits of the use and monitoring of a single target 98 directly or indirectly associated with a home position on an endless chain include: avoidance of damage and wear, which is the reason for preventative maintenance; keeping track of the number of articulations or revolutions, identification of flight numbers; enhancement of troubleshooting, other provisions for predictive maintenance; and controllability for intermittent operation or stopping the conveyor movement to allow use of a probe to measure settling of suspended solids, such as sludge; and to provide information about torque monitoring systems, or even aid in catenary monitoring, described more below.

Another aspect of the present invention relates to apparatus, systems and methods for monitoring catenary (the sagging of flexible members) in the endless chain of a conveyor. This aspect more particularly relates to an apparatus for monitoring catenary in an endless chain conveyor comprising interconnected chain links, the apparatus comprising: a catenary sensor adjacent to the chain and at a location corresponding to the lowest acceptable catenary of the chain; at least one target being mounted on one or more links in one or more positions of the chain, the target being capable of being magnetically sensed by the catenary sensor when the target is adjacent the catenary sensor; the catenary sensor activating a signal when a target on the chain is adjacent the sensor to indicate an unacceptable catenary in the chain.

Figure 5:
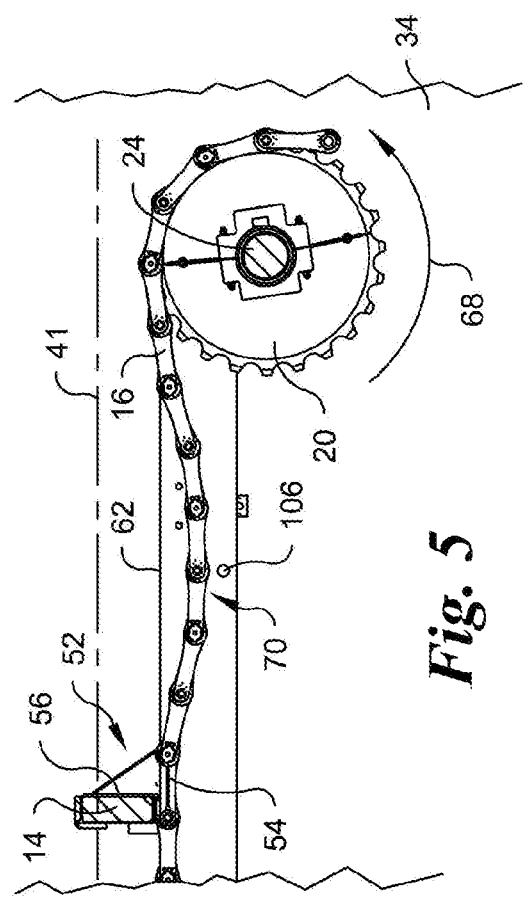
FIG. 5 is a side elevation view of a portion of the endless chain also taken along the lines 3-3 of FIG. 2, with a cross-sectional view of one flight attached to the chain in an environment illustrating the chain and a head shaft sprocket mounted below the intended level of water to be treated in the basin, and also showing a sensor for sensing the catenary of the chain.

This catenary monitoring aspect as exemplified in a wastewater treatment environment, as in other embodiments and aspects of the present invention which is only one of many environments or uses for this type of monitoring, is best seen in FIGS. 3 and 5. The catenary 70 is shown at one typical location for a catenary in the low tension zone 31 of an endless chain in a "downstream area" shortly after the chain passes over the driven sprocket 28, rotating in a counterclockwise direction as indicated by arrow 68. This aspect of the invention will be described as relating to one catenary 70 in a single chain exemplified by chain 16 or chain 18, but it can be used to monitor more than one catenary in multiple areas of the low tension zone or zones 31 of one or more chains. Catenaries can be found in various areas of low tension zones of endless chains depending on the configuration and location of sprockets, etc. supporting the chain for any particular operation.

As best seen in FIG. 5, there is a catenary sensor 106 located at a position, usually at a level below the lowest expected catenary level of the chain, typically because the catenary is affected by the weight of the chain to create the catenary in the chain. The catenary sensor 106 may be a mechanical, optical, inductive or magnetic sensor, for example, generally of the type as described above for a single position sensor when there is one target acting as a home target on a chain. The type of catenary sensor depends on the environment in which the chain and catenary sensor are located and the nature of the target or targets 98 being sensed. It may be that the catenary sensor 106 can simply sense the proximity of the chain itself or any component of or carried by the chain, without any defined target or targets associated with the chain, or the catenary sensor 106 can sense the proximity of the target or targets 98 shown in FIG. 4 mounted on a side member of one or more chain links 72 or the target or targets 98 at locations 100 in the hollow portion or bore 96 of one or more pins 86 connecting the links 72 of the chain.

The catenary sensor 106 may be mounted by a bracket to the support for the upper return rail 62 or otherwise via appropriate bracket supports to a wall of the basin 10, such as the side wall 34. When one or more targets or just the level of the chain at the catenary 70 is adjacent the catenary sensor and its proximity is sensed by the catenary sensor 106, the catenary sensor activates a signal. As with the position sensors 102 and 104 and targets in the first aspect of the invention, the signal sent by the catenary sensor 106 can be visual or auditory or both to alert an operator to stop the conveyor and to inspect, adjust, repair or replace the chain or any components of the conveyor system. Alternatively and preferably, a control system receives the signal or signals from the catenary sensor or catenary sensors regarding the relative position or position of the catenary with respect to the catenary sensors or from each other regarding the catenary sensors fixed adjacent to the respective chains. The control system can alert an operator to manually or preferably automatically stop the conveyor system so that the chains, sprockets and other components of the apparatus can be adjusted, repaired or replaced. In this third aspect, the targets 98 for the catenary sensor 108 can be the identical targets 98 mounted on the side members 74 of the chain links 72 or retained in the hollow portions or bores 96 of the pins 86 as described above concerning the first aspect of the invention relating to flight monitoring.

Monitoring the catenary 70 by any type of proximity catenary sensor 106 that can sense a target mounted on the chain or other component of or carried by the chain is to determine if the extent of the catenary is beyond predetermined tolerance limits appropriate for the chain in any given circumstance. If the tolerance limits are exceeded, for example if the catenary 70 is sensed by the catenary sensor 106 that is located to be able to sense the catenary 70 only when the tolerance limits are exceeded, a signal by the programmed control system is generated to alert an operator to stop the chain from moving, or the control system automatically stops the chain, allowing for inspection, replacement or needed repairs to the chain or the drive or idler components associated with the chain. Such repairs can be exemplified among others as removing one or more links, repairing or replacing the sprocket driving the chain, shifting the centerlines of the shafts for the idler sprockets, adjusting positions of idler sprockets, replacing sprockets, and other types or replacements or repairs. Another example of the purpose of monitoring the catenary or catenaries of a chain are that doing so can provide an indication of a maintenance interval or intervals for preventative maintenance, scheduled replacements of the chain or one or more of its components, etc.

Figure 13:
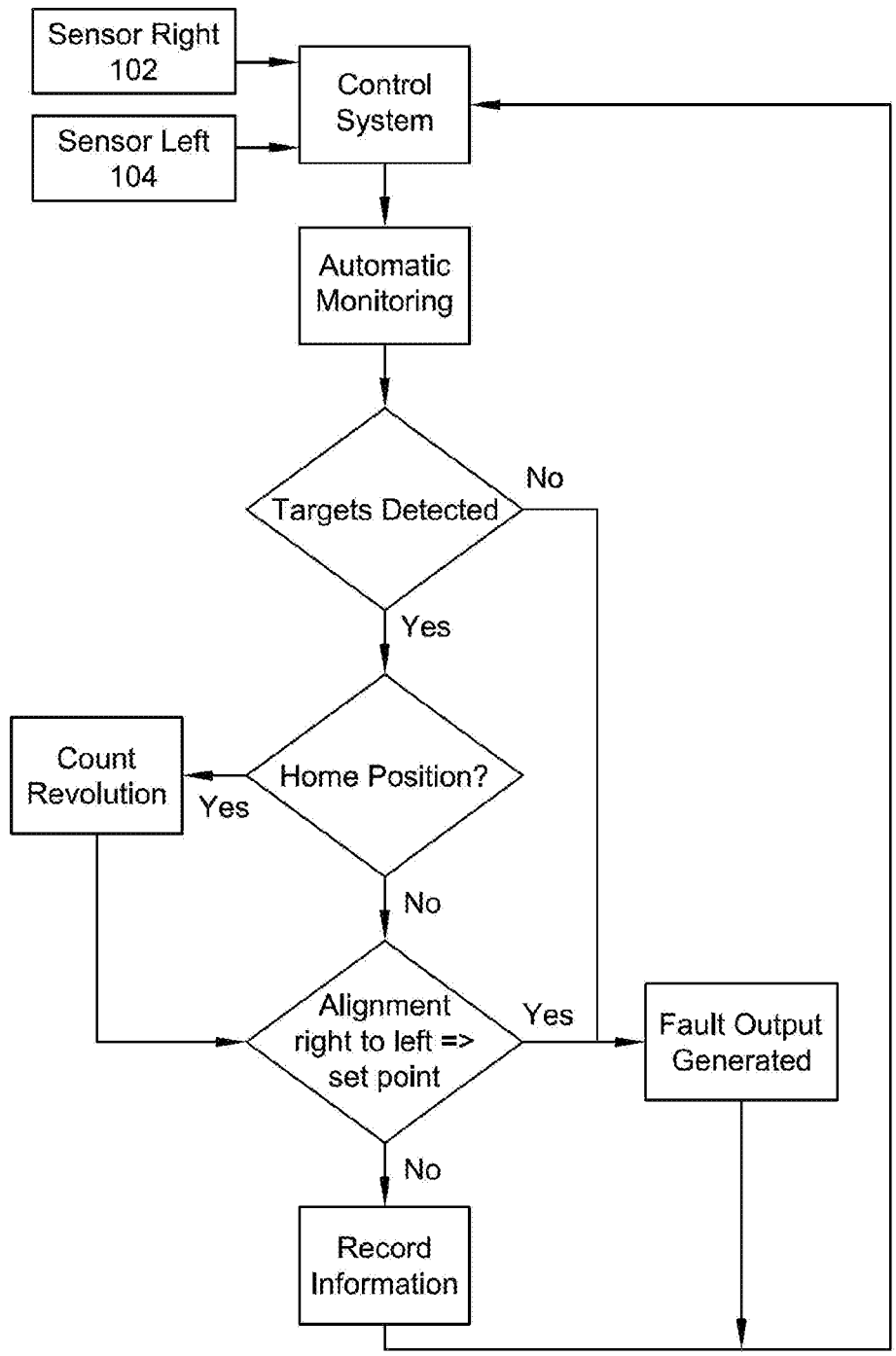
FIG. 13 is a flowchart for an exemplary algorithm that takes into account the nominal difference or allowable time between signal pulses for processing of signals in determining whether there is misalignment of transverse members.

FIG. 13 is a flowchart that illustrates an exemplary program algorithm by which the processor receiving a signal from any of the various types of sensors described above, in the example of the first aspect of determining whether opposite end portions 48, 50 of a flight 14 or other type of transverse member are aligned or misaligned, and if they are misaligned, sending a fault signal to provide a warning or to manually or automatically shut down the conveyor for inspection, repair or replacement. Starting from the top of FIG. 13, the position sensors 102 and 104 (respectively designated as "sensor right" and "sensor left" in FIG. 13) send signals to a control system each time that they sense in sufficient predetermined proximity of the target (if only one or more targets 98 are used as a single position target or even as one or more catenary targets) associated with the end portions 48 or 50 of one or more than one transverse members or flights 14. The control system signals the automatic monitoring based on the programming for any designated purpose, which determines in a decision step whether a proximity signal has been sent indicating that a target or targets 98 have been detected. Since the system expects one target for a single position or a given number and locations of targets associated with the end portions 48, 50 of each of the transverse members or flights 14, if no target or the incorrect number or location of targets is detected during at least one revolution of the chains 16, 18, a no detection signal, referred to in the flowchart as "fault generation output," is sent to the control system to alert an operator to check or manually or automatically shut down the conveyor system and/or its components to determine what is wrong or why no target or targets were detected. Alternatively, the fault generation output signal is sent to the control system where the automatic monitoring system automatically shuts down the conveyor system so that the conveyor 12 and/or its components can be checked.

If a target or targets are detected, a first decision is sought based on pre-programming as to whether the target signal detected is associated with a home link at a "home position" of the target on a chain link. If the answer is yes, a signal is sent to a revolution counter to count the revolution of the chain or chains (or in other aspects and embodiments of the invention, to otherwise process information for any of the benefits described above for detecting a single position on a chain or the presence of excess catenary in the chain). If the answer is yes, a processing signal is sent to check for alignment of the target 98 associated with the right end portion 48 of the transverse member or flight 14 with the target 98 associated with the left end portion 50 of the transverse member or flight 14. If the answer is that there is no target 98 associated with the home position when a target for the home position was expected, a signal is sent though a decision program to generate a fault output, where the fault output is processed as discussed above. If the answer is no because no home position target information was expected, such as the system is not programmed or is inactivated to determine a home position target, the system proceeds to process the signals from the position sensors 102 and 104 ("sensor right" and "sensor left") to determine whether there is appropriate alignment within predetermined values of the target 98 associated with the right end portion 48 of the transverse member or flight 14 with the target 98 associated with the left end portion 50 of the transverse member or flight 14.

The alignment determination is made by comparing the difference in the time the signals are received from the sensor right and the sensor left position sensors 102 and 104 detecting the targets associated with the right end portion 48 and the left end portion 50 of the transverse member or flight 14. If the time difference is within predetermined values ("alignment right to left=>[equals or exceeds] set point"), such that the answer is no, it means that the alignment of the target 98 associated with the right end portion 48 of the transverse member or flight 14 with the target 98 associated with the left end portion 50 of the transverse member or flight 14 is acceptable and a "no" answer is generated. The alignment and other information associated with the decisions and processing is recorded ("record information" box), which is then transferred to the control system so that the process can begin again for the next revolution of the chains 16 and 18. If the time difference between the signals received from detecting the targets 98 associated with the right end portion 48 of the transverse member or flight 14 and the target 98 associated with the left end portion 50 of the transverse member or flight 14 is not within predetermined values ("alignment right to left=>[equals or exceeds] set point"), such that the answer is yes, it means that the targets 98 associated with the right end portion 48 and the left end portion 50 of the transverse member or flight 14 are not within the predetermined values for the end portions 48, 50 of the transverse member or flight 14 to be considered to be in alignment with each other. As a result, a "yes" answer (set point exceeded) causes a fault output to be generated. That fault output is sent to the control system to signal a warning or manual or automatic shutdown of the conveyor system as explained above. That misalignment information is sent for recordation and coordination with the control system, and the process is started again for the next revolution of the chains 16 and 18 after an appropriate inspection, repair or replacement of the conveyor or its components.

The explanation of the flowchart of FIG. 13 also is adaptable in known manners in view of this disclosure to include information about processing and use of data concerning the single position, second aspect of the present invention and with respect to systems and methods for monitoring the catenary in the endless chain of a conveyor as described above regarding the third aspect of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for monitoring alignment of a transverse member in an endless chain conveyor within a basin having a side wall and wastewater in the basin having a water level, where the transverse member is attached transversely at opposite end portions to and between two parallel chains that are mounted below the water level and driven by a head shaft with head shaft sprockets, the apparatus comprising:

two water-tight position sensors mounted below the water level adjacent the head shaft sprockets and in a high tension zone of the chains, one position sensor being located adjacent to each chain at a first fixed position sensor location with respect to the other position sensor at a second fixed position sensor location, the two position sensors attached to the side wall;

at least two targets, at least one target attached to each chain at a fixed target location, the at least two targets being associated with the transverse member by predetermined distances;

the position sensors being capable of inductively or magnetically sensing the relative proximity of the targets associated with the transverse member on each chain and being capable of sending a signal when sensing the targets; and based on the respective signals sent regarding the proximity of the position sensors to the respective targets associated with the transverse member, the apparatus being capable of determining whether the opposite end portions of the transverse member attached to a respective chain are in transverse alignment within predetermined tolerance limits based on timing of the respective signals.

2. The apparatus of claim 1, wherein the apparatus further comprises a motor driving the head shaft transversely aligned with respect to the chains; the head shaft sprockets positioned on opposite ends of the head shaft.

3. The apparatus of claim 1, further comprising a processor to receive the signal from the position sensors regarding the relative proximity of the respective targets on the chains to the respective position sensor locations fixed adjacent to the chains.

4. The apparatus of claim 1, wherein the transverse member is comprised of a plurality of transverse members attached transversely at opposite end portions of the transvers members to the two chains, the plurality of transverse members being spaced from each other along a length of the two parallel chains.

5. The apparatus of claim 1, wherein the transverse member is connected to the two parallel chains by attachment links forming part of the two parallel chains, the attachment links being connected to the two parallel chains adjacent the opposite end portions of the transverse member, the at least two targets being attached to the attachment links at the opposite end portions of the transverse member.

6. The apparatus of claim 1, wherein the two parallel chains are comprised of interconnected chain links, each chain link of the interconnected chain links forming each of the two parallel chains has side members with a first end and a second end, a transverse barrel extending between the first ends of the side members, the first ends of the side members having apertures aligned with the barrel, the second ends of the side members having apertures, the apertures of the second end of the side members of one link being aligned with and transversely next to the apertures of the first ends of the side members of a longitudinally adjacent link, a target of the at least two targets being attached to least one link of the interconnected links per chain.

7. The apparatus of claim 6, wherein a pin extends through the transversely aligned apertures of the longitudinally adjacent links and through the barrel of the one link to connect the links, the pin has a first end and a second end opposite the first end, and wherein a hollow portion or bore extends from the first end of the pin partially toward the second end of the pin, a target of the at leas vo targets being positioned within the hollow portion or bore of the pin.

8. The apparatus of claim 7, wherein the first end of the pin is a head end, and the second end of the pin has a shape mating with at least one of the apertures, a clip at the head end together with the shape of the second end of the pin mating with at least one of the apertures retains the pin in the apertures of the adjacent links and in the barrel of the one link to interconnect the chain links together when the pin is rotated to a retaining position and when the clip is installed at the head end of the pin, the hollow portion or bore extending from the head end of the pin partially toward the second end of the pin.

9. The apparatus of claim 6, wherein the transverse member is attached to the two parallel chains by two attachment links where the two attachment links have attachment portions integrally and unitarily formed with a chain link portion of the interconnected chain links, the attachment portions supporting the opposite end portions of the transverse member, respectively.

10. The apparatus of claim 6, wherein the at least two targets are metal, and the two position sensors are capable of inductively sensing the at least two metal targets.

11. The apparatus of claim 6, wherein the at least two targets are magnetic, and the two position sensors are capable of magnetically sensing the at least two magnetic targets.

12. The apparatus of claim 6, wherein the at least two targets are comprised of a target attached to every link of the interconnected chain links, and wherein the at least two targets are transversely aligned with and face the two position sensors.

13. The apparatus of claim 1, wherein the transverse member is comprised of a plurality of transverse members that are each attached at opposite end portions transversely to the two parallel chains, the plurality of transverse members being spaced from each other, wherein the basin is comprised of a sedimentation basin, the side wall comprised of side walls extending for a length and the basin including end walls extending for a width; the plurality of transverse members are flights in the width or length of the basin to scrape solids which settle at a bottom of the basin, wherein the apparatus further comprises a motor driving the head shaft, each position sensor being located adjacent to the respective head shaft sprocket of the head shaft sprockets.

14. The apparatus of claim 13, wherein the first and second fixed position sensor locations are located outboard of and adjacent to the two parallel chains between a respective chain and a respective adjacent side wall or respective end wall of the basin.

15. The apparatus of claim 13, wherein the first and second fixed position sensor locations are located inboard of and adjacent to each chain of the two parallel chains between a respective chain and a longitudinal midline or transverse midline of the basin.

16. The apparatus of claim 13, wherein the first fixed position sensor location is outboard of and adjacent to one chain of the two parallel chains between the one chain and a respective adjacent side wall or a respective end wall of the basin and the second fixed position sensor location is inboard of and adjacent to the other chain of the two parallel chains between the other chain and a longitudinal midline or transverse midline of the basin.

17. The apparatus of claim 13, wherein the two parallel chains are comprised of interconnected chain links, each chain link of the interconnected chain links has side members with a first end and a second end, a transverse barrel extending between the first ends of the side members, the first ends of the side members having apertures aligned with the barrel, the second ends of the side members having apertures, the apertures of the second end of the side members of one link being aligned with and transversely next to the apertures of the first ends of the side members of a longitudinally adjacent link, a pin extending through the transversely aligned apertures of the longitudinally adjacent links and through the barrel of the one link to connect the one link to the adjacent link.

18. The apparatus of claim 17, wherein the pin has a first end and a second end opposite the first end, and wherein a hollow portion or bore extends from the first end of the pin partially toward the second end of the pin, a target of the at least two targets being within the hollow portion or bore of the pin of at least one chain link of the interconnected links.

19. The apparatus of claim 18, wherein the first end of the pin is a head end, and the second end of the pin has a shape mating with at least one of the apertures, and a clip at the head end together with the shape of the second end of the pin mating with the at least one of the apertures retains the pin to interconnect the chain links together when the pin is rotated to a retaining position and when the clip is installed at the head end of the pin, the hollow portion or bore extending from the head end of the pin partially toward the second end of the pin.

20. An apparatus for monitoring a singular position of an endless chain designated as a home position, the endless chain having a plurality of links and the apparatus mounted in a basin having a wastewater level, the apparatus comprising:
 a position sensor located adjacent to the chain at a fixed position sensor location, the position sensor mounted below the wastewater level;
 a home position target attached to a pin of the endless chain, the home position target positioned in a bore of the pin and the pin connecting a one link to an adjacent link of the plurality of links;
 the position sensor being capable of sensing the home target and being capable of sending a signal when sensing proximity of the home target; and
 based on the signal sent regarding the proximity of the position sensor to the home target, the apparatus being capable of determining each singular position with respect to the endless chain.

21. The apparatus of claim 20, wherein the position sensor is capable of inductively or magnetically sensing the home target, the home target encapsulated in the bore.

22. The apparatus of claim 20, wherein there are two parallel endless chains connected to each other by a plurality of transverse members spaced along the chains, each transverse member connected to the chains adjacent opposite end portions of the transverse members, the home position target being associated with a transverse member.

23. The apparatus of claim 20, wherein there are two parallel endless chains connected to each other by a plurality of transverse members spaced along the chains, each transverse member connected by attachment links forming part of the endless chains, the attachment links being connected to the chains adjacent opposite end portions of the transverse members.

24. The apparatus of claim 20, wherein the plurality of links are comprised of interconnected chain links, each of the interconnected chain links having side members with a first end and a second end, a transverse barrel extending between the first ends of the side members of each of the interconnected chain links, the first ends of the side members of each of the interconnected chain links having apertures aligned with the barrel, the second ends of the side members of each of the interconnected chains having apertures, the apertures of the second end of the side members of the one link being aligned with and transversely next to the apertures of the first end of the side members of the adjacent link, the pin extending through the transversely aligned apertures of the one link and the adjacent link and extending through the barrel of the one link to connect the one link to the adjacent link, the home target facing the position sensor fixed adjacent the chain.

25. The apparatus of claim 20, wherein the pin has a first end and a second end opposite the first end, and wherein the bore extends from the first end of the pin partially, toward the second end of the pin.

26. The apparatus of claim 24, wherein the first end of the pin is a head end, and the second end of the pin has a shape mating with at least one of the apertures of the one link and the adjacent link, and a clip at the head end together with the shape of the second end of the pin retaining the pin in the apertures of the one link and the adjacent link and in the barrel of the one link to interconnect the one link and the adjacent link together when the pin is rotated to a retaining position and when the clip is installed at the head end of the pin, the bore extending from the head end of the pin partially toward the second end of the pin.

* * * * *